United States Patent [19]
de Witte et al.

[11] 3,969,684
[45] July 13, 1976

[54] METHOD FOR REDUCING THE WIDTH OF A LASER PULSE AND A CORRESPONDING DOUBLE-RESONATOR LASER

[75] Inventors: Olivier de Witte, Gif-sur-Yvette; Armand Eranian, Bois Colombes; Pierre Dezauzier, Talence, all of France

[73] Assignee: Agence Nationale de Valorisation de la Recherche (ANVAR), Neuilly-sur-Seine, France

[22] Filed: Jan. 7, 1974

[21] Appl. No.: 431,315

[30] Foreign Application Priority Data
Jan. 12, 1973 France .................. 73.01111

[52] U.S. Cl. .................. 331/94.5 C; 331/94.5 M
[51] Int. Cl.² .................. H01S 3/08; H01S 3/081; H01S 3/10
[58] Field of Search .................. 331/94.5; 330/4.3

[56] References Cited
UNITED STATES PATENTS

| | | | |
|---|---|---|---|
| 3,470,491 | 9/1969 | MacNeille | 331/94.5 C |
| 3,478,277 | 11/1969 | Giordmaine et al. | 331/94.5 |

OTHER PUBLICATIONS

Soviet J. of Quontum Electronics, vol. 1 No. 6, May–June 1972, Venkin et al., pp. 640–642.
Desbois et al., C. R. Acad. Sc. de Paris, vol. 275, 18 Sept. 1972, Series B pp. 415–418.
de Witte et al., Applied Physics Letters, vol. 22, No. 12, June 15, 1973, pp. 644T.
de Witte et al., Optics Communications, vol. 7, 1973.

*Primary Examiner*—Robert J. Webster
*Attorney, Agent, or Firm*—Cameron, Kerkam, Sutton, Stowell & Stowell

[57] ABSTRACT

The laser comprises an amplifying medium which sustains the oscillation within two resonators, one resonator being formed by the mirrors $M_1$ and $M'_1$ and the other being formed by the mirrors $M_2$ and $M'_2$. The quality factor of the second resonator is higher than that of the first resonator. The time-duration of the pulse extracted from the first resonator is adjusted by modifying the quality factor of the second resonator.

The double-resonator laser serves to generate pulses of very small width, especially in dye lasers, and to adjust pulse-widths in such applications as telemetry.

21 Claims, 13 Drawing Figures

METHOD FOR REDUCING THE WIDTH OF A LASER PULSE AND A CORRESPONDING DOUBLE-RESONATOR LASER

This invention relates to a method for reducing the time-duration of a laser pulse and to a corresponding double-resonator laser. The invention finds an application in many branches of physics, especially in the construction of lasers which emit short pulses for use in telemetry or in the study of the kinetics of response of either electronic or physical systems. The invention is applicable to all types of lasers which employ an amplifying medium consisting of a solid, a gas or a liquid excited by either optical, electronic or chemical pumping.

It is known that the application of the so-called Q-switching phenomenon has made it possible to obtain very short pulses from lasers which, under normal operating conditions, emit pulses having widths which are greater by several orders of magnitude. It may be recalled in brief outline that this principle consists in placing within the cavity a shutter which prevents the oscillation from occurring during the first stage of pumping of the amplifying rod and in abruptly opening the shutter in order to utilize to advantage the entire energy which has been stored in the amplifying medium in the upper level of the transition employed. This device gives good results in the case of a large number of lasers such as the ruby lasers or the neodymium-doped glass lasers. There are, however, two disadvantages attached to said device: in the first place, it entails the use of an electro-optical shutter associated with supply means which must have a very high speed; these electro-optical devices are usually Kerr or Pockels cells which call for high supply voltages and this in turn entails the use of costly material. In the second place, this method is applicable only to media in which the lifetime of the upper excited state is sufficiently long to permit the occurrence of the energy-storage phenomenon in this state. In point of fact, the lifetime of this upper level is very short in many cases, with the result that the very principle of Q-switching is inapplicable: this is the case, for example, with the very large family of dye lasers in which the lifetime of the first excited singlet state can be of the order of $10^{-9}$ to $10^{-8}$ second, and the same applies to certain types of gas lasers such as the ion or nitrogen lasers in which the lifetime of the upper state can be shorter than $10^{-8}$ second.

The electro-optical devices which perform the function of shutters can naturally be employed in lasers in which the lifetime of the upper state is short. In this case, however, there is no Q-switching action proper but a simple chopping action. This is the solution adopted at the present time when it is desired to obtain short pulses with the dye lasers in particular. This method and the devices for applying the method result in heavy, cumbersome and especially very costly equipment for the reasons which have been mentioned earlier. The precise aim of the present inventon is to provide a method for obtaining short pulses and a laser for carrying out said method, thereby dispensing with the need for the above-mentioned electro-optical devices and permitting the generation of very short pulses solely by means of a judicious construction of the laser resonator.

In exact terms, the present invention is directed to a method for adjusting the width of the light pulse emitted by a laser comprising an amplifying medium excited by pulsed pumping means, said medium being placed within a first resonator which is the source of a first oscillation sustained by a transition of the amplifying medium, wherein said amplifying medium is employed for the purpose of sustaining by means of the same transition a second oscillation in competition with the first oscillation within a second resonator which is tuned to said transition, the quality factor of said second resonator being higher than the quality factor of said first resonator and wherein a fraction of the energy of said first oscillation of said first resonator is extracted and said fraction of energy forms said pulse of adjustable width emitted by the laser, said width being adjusted by modifying the quality factor of said second resonator.

As will become more readily apparent hereinafter, the difference in quality factor between the two resonators results in a difference in the kinetics of build-up of the oscillation within said resonators, said difference being turned to profitable account in accordance with the invention for reducing the width of the light pulse extracted from the first resonator by means of a phenomenon of competition between the oscillation within said resonator and the oscillation within the second resonator.

The pulse which has thus been reduced can be adjusted for width by modifying the quality factor of the second resonator. A number of methods for performing said adjustment are contemplated by the invention: either by producing action on the length of the second resonator or by producing action on the coefficient of reflection of the mirrors forming said second resonator or finally by producing action on losses introduced into the second resonator.

The invention is also directed to a laser which emits a light pulse of adjustable width comprising an amplifying medium excited by pulsed pumping means, said medium being placed within a first resonator in which a transition of the amplifying medium sustains a first oscillation, a fraction of the energy of said first oscillation being extracted from said first resonator and intended to constitute said pulse emitted by the laser, wherein said amplifying medium is also placed within a second resonator tuned to said transition, the quality factor of said second resonator being higher than the quality factor of said first resonator and comprising means for extracting a fraction of the energy corresponding to the first oscillation, said fraction being intended to form said pulse of adjustable width and means for adjusting said quality factor of said second resonator.

A resonator tuned to a transition is understood to mean simply a resonator consisting of mirrors which reflect in the vicinity of the wavelength of said transition.

The invention contemplates a number of particular embodiments, especially in the case in which the amplifying medium is constituted by a liquid fluorescent solution.

The properties and advantages of the invention will in any case be more readily understood by consideration of the following description of exemplified embodiments which are given by way of explanation without any implied limitation, reference being made to the accompanying drawings, wherein.

Figure 1:
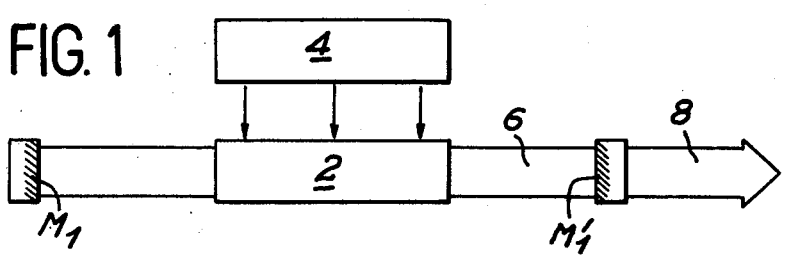
FIG. 1 illustrates schematically the known structure of a laser.

Referring now to FIG. 1, it will briefly be recalled that, broadly speaking, a laser is a device comprising an amplifying medium 2 placed within a resonator consisting of two mirrors $M_1$ and $M'_1$ and excited by suitable means 4; the resonator is tuned to the wavelength of transition of the medium 2 at which amplification takes place and an oscillation occurs within said resonator, with the result that a beam 6 is formed within the interior of the cavity. In general, the mirror $M_1$ has a high coefficient of reflection ($R_1 \simeq 1$) and the mirror $M'_1$ is semi-reflecting ($R'_1 < 1$), with the result that a fraction 8 of the beam 6 is extracted from the resonator and constitutes the laser output beam.

Figure 2:
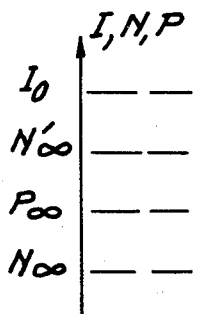
FIG. 2 is a diagram illustrating the evolutions of the population inversion and of the density of photons within the resonator of a laser, in the case of theoretical excitation in steps.

In order that the method according to the invention may be more clearly understood, the progressive variations of a certain number of characteristics of the laser of the type shown in FIG. 1 will be recalled in very broad outline with reference to the diagram of FIG. 2. This diagram illustrates the evolution of the population inversion N and of the density of photons P within the resonator, in the case of a theoretical excitation I in the form of an amplitude step Io. The time is plotted as abscissae and the origin is taken at the moment when the excitation is applied to the medium contained within the resonator. In order to simplify the description of the phenomena, it will be assumed without limiting the invention to this particular case that the lifetime of the upper level of the transition employed is very short compared with the duration of the phenomena under study, with the result that the population density N would assume a limiting value $N'_\infty$ after a very short time if no oscillation had taken place within the cavity. In reality, as soon as the population inversion attains the threshold of oscillation within the resonator, the density of photons increases very rapidly. The stimulated wave whose intensity increases within the cavity is supplied from the population of excited states of the amplifying medium. The increase in density P therefore causes a correlative decrease in the density N. A state of equilibrium is attained when the density of photons within the cavity assumes the value $P_\infty$ and the population inversion assumes the value $N_\infty$, these limiting values being such that the gain of the amplifying medium exactly compensates for the resonator losses. The limiting value $P_\infty$ is proportional to the excitation intensity Io.

In the case of amplifying media in which the time of decay of the upper level of the transition is longer than the optical pumping period, the description of the kinetics of the phenomena is more complicated by reason of build-up phenomena but the general principle involved in the evolution of values would remain the same apart from possible oscillation phenomena at the beginning of excitation which have no bearing on the present discussion.

The theoretical determination of the exact shape of the curves shown in FIG. 2 is complex. In fact, in order to determine the theoretical evolution of the values P and M, it is necessary to write the equation of evolution of the population of the upper level as well as that of the lower level and that of the density of photons within the cavity. This calls for resolution of three coupled differential equations. It is not necessary in this instance to set and to solve these equations in order to understand the principle of the invention. It will simply be noted qualitatively that the rate of increase in the density of photons is substantially inversely proportional to the quality factor of the resonator as in any phenomenon of build-up of energy stored in a resonator. The slope of the curve P at the origin is therefore substantially inversely proportional to the quality factor of the resonator employed.

By quality factor is meant the usual value defined as being equal to $2\pi$ times the ratio of the energy stored within the resonator to the energy lost per cycle within this cavity. If $\omega$ designates the angular frequency of the stimulated radiation, L designates the length of the resonator, c designates the velocity of light, R designates the mean coefficient of reflection ($R = \sqrt{R_1 R'_1}$) and A designates the loses within the resonator, it can readily be understood that the expression of the quality factor aforesaid is: $Q = \Phi \, L/c(1-R+A)$.

It will therefore be assumed (which is in any case wholly verified by experience as will be seen hereinafter) that the build-up of the laser wave within the resonator is substantially inversely proportional to the quality factor Q of said resonator as defined earlier.

Figure 3:
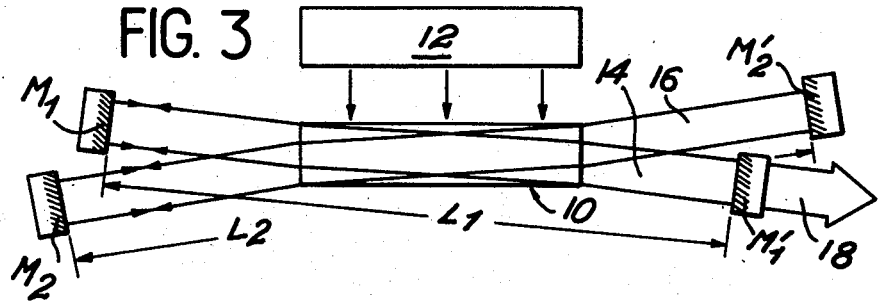
FIG. 3 illustrates a two-cavity laser in accordance with the invention.

Consideration will accordingly be given to a two-cavity laser of the type shown in FIG. 3. In this figure, the laser again comprises an amplifying medium 10 excited by suitable means 12 and placed within two resonators, one resonator being constituted by the mirrors $M_1$, $M'_1$ and having a length $L_1$, the other resonator being constituted by the mirrors $M_2$, $M'_2$ and having a length $L_2$. Under suitable conditions of excitation, two laser waves can therefore be formed within these two resonators, namely a wave 14 within the first resonator and a wave 16 within the second resonator. The portion 18 of the wave 14 which is extracted from the first resonator constitutes the pulse of the laser which is employed and the characteristics of which will now be studied.

Figure 4:
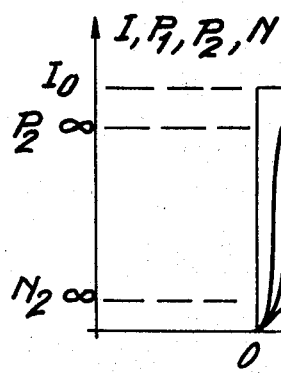
FIG. 4 is a diagram showing the evolutions of the population inversion and of the photon density within each of the two resonators of the laser in accordance with the invention.

This study can be made in the same manner as before, by plotting a diagram which shows the evolution of the population inversion in the amplfiying medium 10 and the correlative evolutions of the photon densities within the two resonators. This is shown in FIG. 4. In this figure, the excitation I of the amplifying medium is again assumed for the sake of simplicity to be of the step type having an amplitude Io. It has also been assumed that the quality factor of the second resonator is higher than that of the first resonator. This can be obtained, for example, by giving the second resonator a length $L_2$ which is greater than the length $L_1$ of the first resonator and by making use of a mirror $M'_2$ having a coefficient of reflection $R'_2$ which is higher than the coefficient $R'_1$ of the mirror $M'_1$, both mirrors $M_1$ and $M_2$ being totally reflecting ($R_1 = R_2 = 1$), for example. The amplifying medium 10 is employed for the purpose of sustaining the two oscillations 14 and 16 within the first and the second resonator. Since the quality factors of the two resonators are different ($Q_1 < Q_2$), the increase in density of photons $P_1$ within the first resonator is more rapid than the increase in density of photons $P_2$ within the second resonator. The curve $P_1$ is therefore above the curve $P_2$ and its slope in the vicinity of the origin exceeds the slope of the curve $P_2$. The population inversion which is intended to sustain the oscillation within both resonators decreases very rapidly. Since the quality factor of the second resonator is higher than the quality factor of the first resonator, the energy which is stored in the second resonator and builds up at a lower rate than the energy stored in the second resonator nevertheless attains a limiting value which is higher than the limit which would be obtained with the first resonator if this latter were employed alone. In consequence, when the steady state is attained, the gain of the amplifying medium 10 exactly compensates for the losses of the second resonator. Since these losses are smaller than the losses of the first resonator, this limiting population inversion $(N_2)_\infty$ is insufficient to ensure maintenance of the oscillation within the first resonator. In consequence, the oscillation within the first resonator cannot be sustained beyond a certain time-duration $t_0$. The instant $t_0$ corresponds to the moment when that portion of the population inversion which is employed for sustaining the oscillation within the first resonator is just sufficient to make up for the losses within said first resonator. There is therefore obtained within the first resonator a pulse which has the prematurely truncated shape of the curve $P_1$. The emission extracted from the second resonator naturally has the shape of the curve $P_2$ and the limiting value $(P_2)_\infty$ is proportional to the excitation intensity Io.

In other words, in the method according to the invention, the amplifying medium is employed for the purpose of sustaining in the same transition two oscillations within two resonators having different quality factors. The effect of the differences in kinetics within the two resonators is such that this results in a competition between the two oscillations, thereby reducing the time of oscillation within that resonator which has the lowest quality factor.

In order to cause the time-duration of the pulse extracted from the first resonator to vary, it is only necessary to produce a variation in the quality factor of the second resonator. With this objective, the invention contemplates at least three methods which consist:

a. in modifying the means coefficient of reflection R of the second resonator: a high coefficient of reflection results in a high quality factor, which has the effect of flattening the curve $P_2$ and therefore of displacing the instant $t_0$ and lengthening the pulse extracted from the first resonator;

b. in producing action on the length $L_2$ of the second resonator; if $L_2$ increases in length, the quality factor increases proportionally and the pulse extracted from the first resonator is lengthened;

c. in modifying the losses A of the second resonator; a reduction in the losses A results in an increase in the quality factor and also in lengthening of the pulse employed.

The schematic arrangement of the two-resonator laser in accordance with the invention as shown in FIG. 3 is more theoretical than practical. In actual fact and particularly in the case in which the amplifying medium is constituted by a solution having a dye base, the system can be designed in one particular embodiment in accordance with the arrangement shown in FIG. 5. In this figure, the amplifying medium is constituted by a fluorescent solution 20 contained in a vessel 22 having the shape of a rectangular parallelepiped. The excitation means are constituted by an auxiliary laser 24 and especially a Q-switched laser which emits an exciting radiation 26 directed into the solution 20. The first resonator which has a low quality factor is constituted by the two faces 28 and 30 of the vessel 22; these two faces can be treated with semi-reflecting coatings or simply employed with their Fresnel reflection resulting from the mismatching of refractive indices between the air and the glass which constitutes the vessel 22. The second resonator has a higher quality factor and is formed by the mirrors $M_2$ and $M'_2$; the mirror $M_2$ is placed on a table 32 which can be displaced in translational motion by means of the micrometer screw 34. In one advantageous embodiment, the mirror $M_2$ can be a trirectangular trihedron, thereby reducing the problems of alignment since said trihedron has the known property of reflecting the light rays in the direction of incidence. A shutter 36 may or may not be placed within the second resonator. The laser beam employed is the beam 38 which emerges in the axis of the first resonator.

Figure 5:
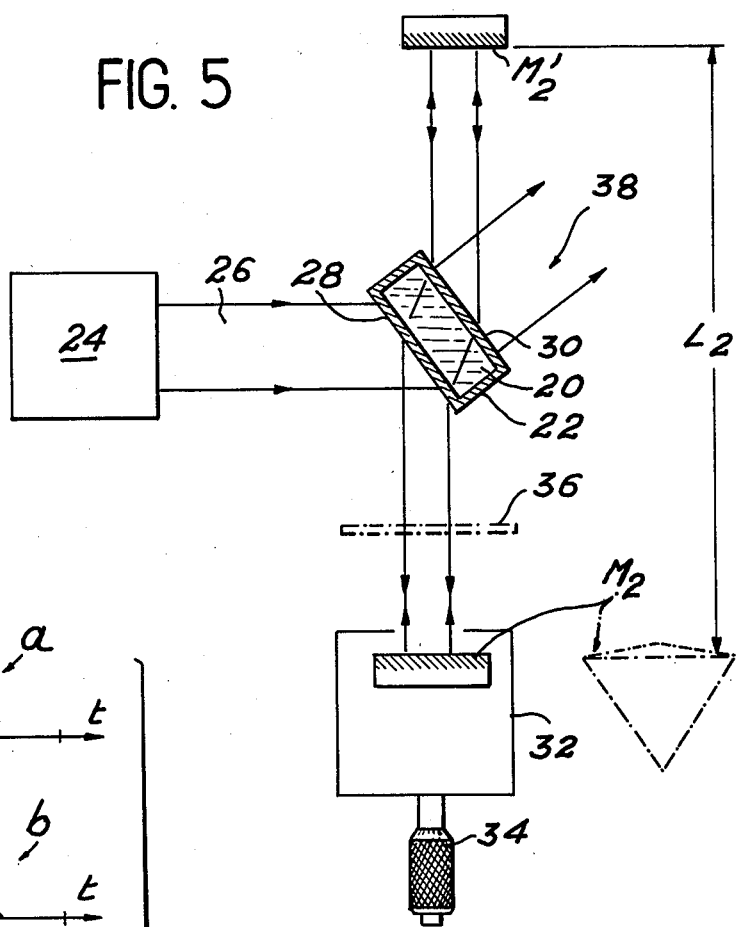
FIG. 5 is a diagram of a system in which an auxiliary laser is employed as excitation source and in which a fluorescent solution contained in a rectangular vessel is employed as amplifying medium.

The system of FIG. 5 is distinguished from known arrangements of this type by the fact that it comprises a second resonator of variable length and constituted by the mirrors $M_2$ and $M'_2$. So far as concerns the operating characteristics of a dye laser having a single resonator and excited by a Q-switched laser, reference can be made, for example, to the article by P. P. Sorokin et al., published in "I.B.M. Journal of Research and Development", vol. 10, 1966, page 162 and to the articles by M. L. Spaeth et al. and by F. P. Schafer et al., published in "Applied Physics Letters" vol. 9, No. 5 and 8, 1966. In the original system according to the invention, the presence of the second resonator has the effect of shortening the pulse 38 of stimulated radiation emitted by the dye. The time-duration of said pulse 38 can be adjusted by modifying the length $L_2$ by means of the micrometer screw 34 which displaces the table 32 and consequently the mirror $M_2$ in translational motion.

Figure 6:
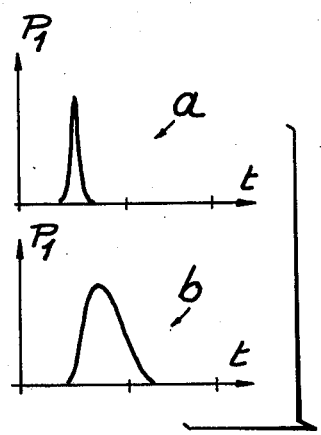
FIG. 6 represents the pulse extracted from the first resonator in the case of the system shown in FIG. 4, with and without the second resonator.

The experimental results obtained by the inventors who have constructed the system shown in FIG. 5 are given in FIG. 6. The cruve 6a represents the time-dependent variation of the pulse 38 extracted from the first resonator when the shutter 36 is withdrawn, that is to say when the second resonator is employed. The scale is 20 nanoseconds per division. The pulse 6b represents the same pulse 38 derived from the first resonator when the shutter 36 is placed in the second resonator, which is equivalent to a single-resonator system of the prior art. The increase in width of the pulse 38 can readily be seen by comparing FIG. 6a with FIG. 6b, the phenomena which are illustrated in FIG. 4 being thus perfectly represented. The fact that the light pulse stops after about twenty nanoseconds is simply due to the fact that the excitation pulse 26 itself has a time-duration of about twenty nanoseconds.

Figure 7:
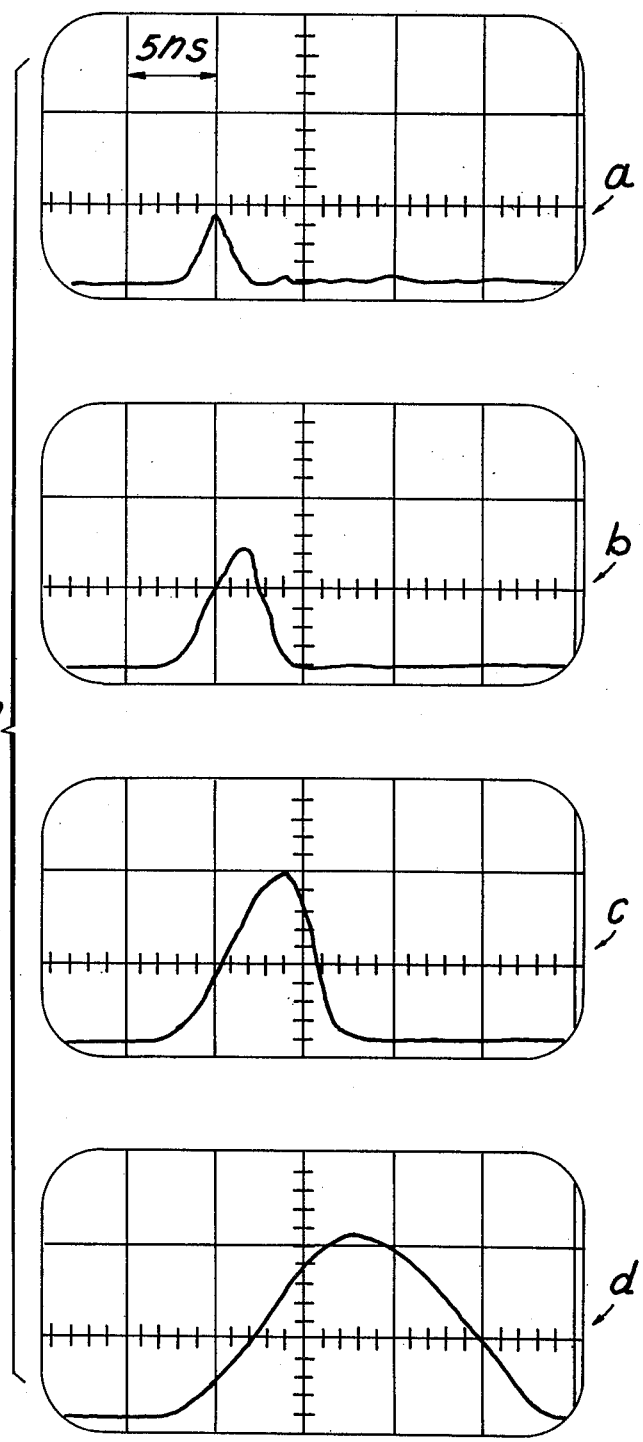
FIG. 7 represents four laser pulses extracted from the first resonator in respect of four different wavelengths of the second resonator.

When the length $L_2$ of the second resonator is varied continuously by means of the translational-motion table 32, a continuous variation of the time-duration of the laser pulse 38 emitted by the first resonator is observed. This is shown in FIG. 7 which gives the shape of the pulse 38 in respect of four values of the length $L_2$. From a to d, the length $L_2$ has the values respectively of 6 cm, 9 cm, 18 cm and 36 cm. These curves are wholly in agreement with the simplified theory which has been given in the foregoing.

By way of explanation, the experimental conditions which have made it possible to obtain these results were as follows: the parallelepipedal vessel was a spectroscopic cell having width of 2 mm and a wall thickness of 1 mm. The cell was oriented at an angle of 50° with respect to the emission of the Q-switched ruby laser. The first resonator was constituted solely by the Fresnel reflections from the vessel walls ($R_1 = R'_1 =$ 4%). The second resonator was constituted by a mirror $M_2$ having a maximum coefficient of reflection ($R_2 \simeq$ 1) and mirror $M'_2$ having a coefficient of reflection $R'_2$ = 86%. The axis of the second resonator was perpendicular to the direction of the emergent beam of the Q-switched ruby laser. The length of the second resonator could vary between 6 cm and 36 cm. The energy of the ruby laser beam was approximately 10 mJ in respect of a time-duration of 20 nanoseconds. The dye employed was a $10^{-4}$M solution of 1,3,3,1′,3,3′,-Hexamethyl1-2,2′-indotricarbocyanineiodide (HITC) in acetone and the wavelength of the stimulated emission was in the region of 7810 A.

Figure 8:
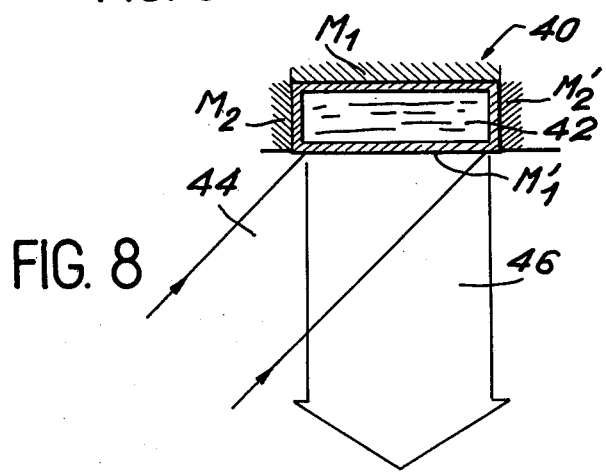
FIG. 8 is an alternative construction of the system shown in FIG. 4.

The arrangement shown in FIG. 5 is naturally only one example of construction of the two-resonator laser in accordance with the invention. Many other arrangements are possible: the alternative form which is illustrated in FIG. 8 is very similar to the arrangement of FIG. 5. There is employed in this form of construction a vessel 40 having the shape of a rectangular parallelepiped which contains a solution 42, for example a fluorescent solute of dye in a solvent. The large faces of the vessel constitute the mirrors $M_1$ and $M'_1$ of the first resonator and the small faces constitute the mirrors $M_2$ and $M'_2$ of the second resonator. The exciting beam 44 strikes the vessel at an oblique angle of incidence or if necessary in a direction at right angles to the plane of the figure. The short laser pulse which is collected is the pulse 46 emitted in the axis of the first resonator. The coefficients of reflection of the mirrors $M_1$, $M'_1$, $M_2$, $M'_2$, can be adjusted so that the time-duration of the pulse 46 is close to the desired value. In this system, said duration is fixed and determined by design but the advantage of a device of this type lies in the fact that it does not contain any moving part and that the characteristics of the pulse are wholly reproducible.

It is apparent that the auxiliary optical pumping laser can be different from a ruby laser: it is possible to employ a nitrogen laser which emits at about 3371 A at a repetition frequency which can be of high value or, at the other end of the spectrum, a neodymium-doped glass laser or a YAG laser used in the pulse mode.

Figure 9:
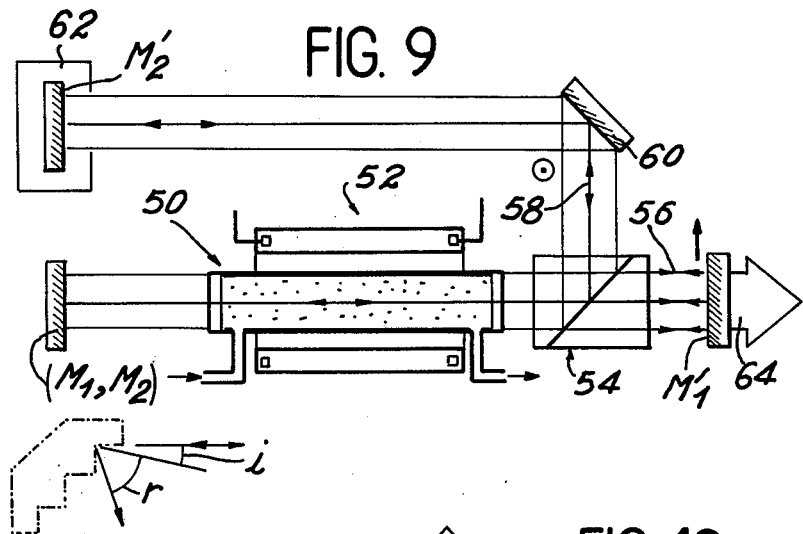
FIG. 9 illustrates a two-resonator laser in which a beam-splitter is employed for the purpose of reversing one of the resonators in an alternative embodiment which makes use of a liquid laser pumped by a flashtube.

The invention is not limited to a laser which employs a Q-switched laser as an excitation means. In FIG. 9, there is shown a two-resonator laser which employs a beam-splitter which serves to reverse the second resonator in an alternative form of construction in which the excitation means are precisely constituted by a flash-tube. In this figure, there is shown a cylindrical tube 50 containing the medium to be excited, especially a circulating fluorescent liquid placed within a first resonator consisting of the mirrors $M_1$ and $M'_1$. Said medium 50 is excited by a flash-tube 52 and especially a coaxial tube supplied by electrical means which are not illustrated. A beam-splitter 54 gives rise to two beams 56 and 58, the beam 56 being in the axis of the first resonator and the beam 58 being directed by means of a reflecting mirror 60 into a second resonator constituted by the mirror $M'_2$ and the mirror $M_2$ which coincides with the mirror $M_1$. The beam-splitting device 54 is advantageously constituted by a polarizing prism which can be of the Glazebrook, Nicol, Foucault or Glan prism type. A polarizing prism of this type gives rise to two rays 56 and 58 having perpendicular polarizations; in the case shown in the figure, the polarization of the beam 56 is parallel to the plane of the figure and the polarization of the ray 58 is perpendicular to the plane of the figure. The mirror $M'_2$ of the second resonator can be mounted on a translational-motion table 62 which makes it possible to vary the length $L_2$ of the second resonator and, as has been noted earlier, the time-duration of the laser pulse 64 extracted from the first resonator. If the medium 50 is a dye, it is known to be particularly advantageous to make use of a mirror consisting of a diffraction grating mounted as an autocollimator as shown in chain-dotted lines next to the mirror $M_1$.

The laser described in the foregoing is distinguished from the lasers of the prior art in that it contains two resonators coupled by means of the beam-splitter 54.

For further details concerning the construction of a dye laser which makes use of a single resonator in accordance with known practice, reference can be made for example to the article by P. P. Sorokin et al. published in "I.B.M. Journal of Research and Development", vol. 11, 1967, pages 130 and 148 and the article by B. K. Soffer et al. published in "Applied Physics Letters", vol. 10, No. 7, 1967, page 208.

Although the polarizations of the beams 56 and 58 are perpendicular, the interaction between the two waves by means of the amplifying medium is possible since the rotation of the molecules in solution is much more rapid than their lifetime in the excited state and the round-trip time within the cavity. A population of excited molecules in the upper state can therefore very readily sustain two oscillations having different polarizations without any need for separation between one group of molecules having an orientation such as to interact with the radiation which has a certain direction of polarization and a second group having an orientation such as to interact with the radiation which has the perpendicular direction of polarization. The difference in orientation of the polarizations is therefore not a bar to competition between the oscillations within the two resonators. In the case in which the medium 50 is a solution of rhodamine 6G in ethanol, the inventors have been able to vary the time-duration of pulses emitted in the direction 64 from a few nanoseconds to a few tens of nanoseconds in the case of a flash-tube 52 in which the duration of the excitation pulses was of the order of 1 microsecond, this being achieved by varying the length of the second resonator by means of the translational-motion table 62.

Figure 10:
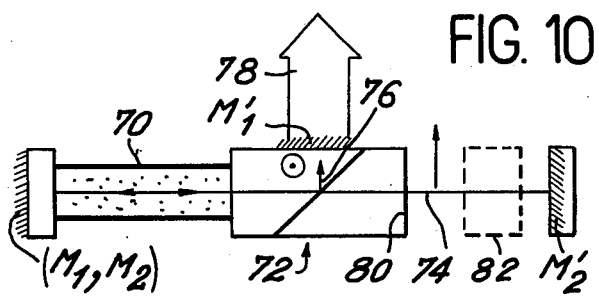
FIG. 10 is an alternative embodiment of the system shown in FIG. 9 in which the first resonator is reversed.

The invention is not limited to the case in which the second resonator is reversed by means of a beam-splitter. In FIG. 10, there is shown an alternative form of construction in which the first resonator is reversed whilst the second resonator is erect. In this figure, an amplifying medium 70 excited by means (not shown) is associated with a beam-splitter 72, especially a Glan prism, and with a mirror $M_1$ which is sealed onto the amplifying tube 70. In the same manner as the beam-splitter 54 of the previous figure, the beam-splitter 72 produces two rays 74 and 76 in which the directions of polarization are perpendicular: the polarization of the beam 74 is parallel to the plane of the figure and that of the beam 76 is perpendicular to the plane of the figure. The face $M'_1$ of beam-splitter 72 can be treated if necessary with semi-reflecting coatings and constitutes with the mirror $M_1$ the first reversed resonator having a low quality factor. The second resonator is constituted by the mirror $M_2$ which coincides with $M_1$ and the mirror $M'_2$ which is movable and located in the axis of the device. The short pulse of adjustable width is emitted at right angles to the general axis of the device in the form of the beam 78. The device 82 is an auxiliary device having variable losses which can be placed if necessary within the second resonator and the design function of which will be explained hereinafter.

The advantage of this embodiment lies in the fact that the movable mirror $M'_2$, the position of which partly determines the time-duration of the pulse 78, is located in the axis of the device, thereby making the mechanical arrangement of the assembly more convenient when the elements are mounted, for example, on an optical bench. As will naturally be understood, it is only for the sake of explanatory illustration that the amplifying medium 70 is represented as being made integral with the mirror $M_1$ and with the beam-splitting device 72.

Should it be found desirable to obtain a pulse 78 having a fixed time-duration, it is a very easy matter, after adjustments and determination of the length $L_2$, to employ a transparent rod of sufficient length, one face of which is bonded to the selector 72 and the other face of which is covered with reflecting coatings so as to form the mirror $M'_2$. It is even possible in some cases to deposit the coatings directly on the rear face of the prism 72. In the two alternative arrangements just mentioned, all the elements are bonded together, thereby endowing the structure with a high degree of stability and resulting in good reproducibility of performances.

The invention is not limited to the case in which one of the resonators is reversed by means of a beam-splitter of the polarizing prism type. It is also possible to employ within the scope of the invention a device of the type shown in FIG. 11 which essentially comprises a brewster-angle dioptric element. In this figure, an amplifying medium 91 such as a gaseous medium, for example, and consisting in particular of a mixture of $CO_2$, $N_2$ and He, and excited by means of a large number of discharges produced between a plurality of cathodes 90 and an anode 92 connected to an electric power supply (not shown). Said medium is associated with a mirror $M_1$ by means of a flexible membrane 93 and a beam-splitting device 94 by means of a second flexible membrane 97. The beam-splitting device is constituted by an isosceles prism which is transparent to the wavelength of the stimulated radiation 98 and the exit face 96 of which is at the Brewster angle of incidence with respect to the beam 98. The component of said beam 98 which is polarized perpendicularly to the plane of the figure is partially reflected from the face 96 and gives rise to a beam 100 which is perpendicular to the face 102 of the prism 94. It can readily be seen that this condition is achieved in the case of an isosceles prism having angles at the base which are equal to the Brewster angle. The component of the beam 104 which is parallel to the plane of the figure is transmitted without loss through the dioptric element 96 in accordance with Brewster's law. At least one Brewster-angle plate 95 can be placed after the beam-splitter 94. The mirror $M'_2$ constitutes the second mirror of the second resonator. The face 102 of the prism 94 can be provided if necessary with semi-reflecting coatings so as to form the mirror $M'_1$ of the first resonator. If the beam 104 still contains after traversing the dioptric element 96 a component of polarization at right angles to the plane of the figure and derived from the incident beam 98 which has not been totally reflected from the dioptric element 96, the inclined plates 95 complete the polarization of the beam 104 in the plane of the figure.

Figure 11:
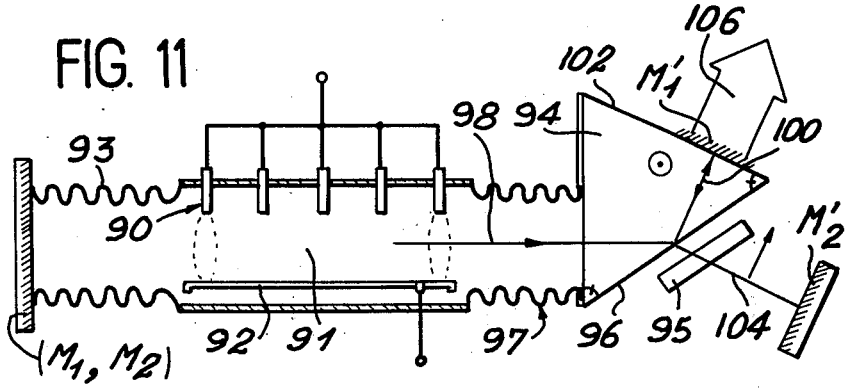
FIG. 11 illustrates a system in which the beam-splitter is designed in the form of an isosceles prism, one face of which is inclined at the Brewster angle of incidence, in an alternative embodiment which makes use of a gas laser.

The operation of the two-resonator laser of FIG. 11 is similar to that of the laser of FIG. 10. The oscillation increases more rapidly within the first resonator consisting of the mirrors $M_1$ and $M'_1$ than in the second resonator consisting of the mirrors $M_2$ and $M'_2$ since the reflection from the dioptric element 96 is carried out in the case of the component which is polarized perpendicularly to the plane of the figure with a low coefficient of reflection which reduces the quality factor of the first resonator. On the contrary, the transmission of the beam 104 through the dioptric element 96 and the plates 95 is carried out practically without loss in the case of polarization parallel to the plane of the figure, with the result that the second resonator has a quality factor which is higher than that of the first resonator. In consequence, the oscillation already increases within the first resonator and is then damped by the oscillation within the second resonator which is supplied from the same amplifying medium 91. The two beams which are polarized in perpendicular directions are again in competition by virtue of the molecular agitation of the amplifying medium. In the case in which the amplifying medium is the well known mixture of carbon dioxide, nitrogen and helium, the stimulated emission takes place at about 10.6 $\mu$. The prism 94 and the plates 95 are then advantageously of salt such as sodium chloride, for example, and can readily be constructed.

The description thus far has dealt with devices in which adjustment of the time-duration of the pulse extracted from the first resonator is obtained by modifying the length of the second resonator or the coefficient of reflection of the mirrors which form said second resonator. The formula which has been recalled in the foregoing and gives the value of the quality factor of a resonator indicates that action can be produced on said quality factor in a third manner by modifying the losses A of the resonator. A simple means consists in introducing a variable-loss device into the second resonator. This device is placed in a laser of the type shown in FIG. 10, in the portion which is specific to the second resonator, for example in the place of the element designated by the reference 82.

Figure 12:
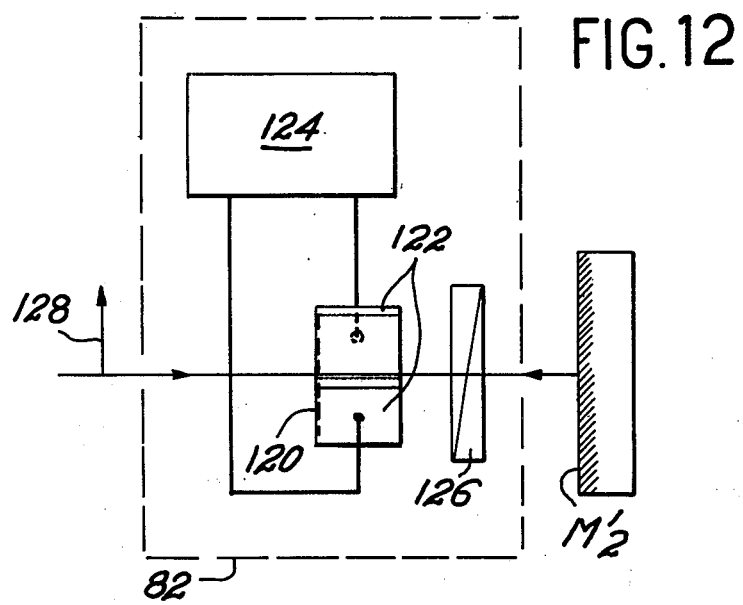
FIG. 12 is an example of construction of a variable attenuator which makes use of electro-optical material.

In order to introduce variable losses into the second resonator, the simplest means consist in making use of an inhomogeneous attenuator which is displaced mechanically within the resonator. However, the invention contemplates the use of devices which do not call for any mechanical displacement and which are therefore very easy to use. This is the case with the device which is illustrated in FIG. 12.

In this figure, there is shown one example of construction of a variable attenuator which employs an electro-optical cell. The assembly 82 comprises a birefringent electro-optical material 120 interposed between two flat and parallel electrodes 122 between which an electric field can be applied by means of a voltage supply 124. The orientation of the electro-optical cell is such that the electric field is at an angle of 45° with respect to the direction of polarization 128 of the radiation. The electro-optical cell is associated with an analyzer 126, the direction of which is parallel to the direction of polarization 128. As shown in FIG. 10, said element 82 is placed in the proximity of the mirror $M'_2$ of the second resonator.

Said attenuator operates as follows: if no voltage is applied to the electrodes 122, the birefringence of the material 120 is zero and the radiation which is polarized in the direction 128 traverses the cell without modifying the direction of polarization. The analyzer 126 therefore allows said radiation to pass without attenuation. After reflection from the mirror $M'_2$, the second traversal again takes place without attenuation except for the losses within the different elements. When a voltage is applied to the electrodes 122, the electric field applied to the material 120 modifies the conditions of propagation of the incident radiation and gives rise at the exit of the cell to a radiation of elliptical polarization in which only the component which is parallel to the direction 128 passes through the analyzer 126 without suffering any loss. There is therefore a partial attenuation of the incident radiation. After reflection from the mirror $M'_2$, the rectilinear-polarization wave undergoes a further change in polarization as it traverses the material 120 and the elliptical wave undergoes a further attenuation as it traverses the beam-splitter, for example within the prism 72 of FIG. 10. The application of an electric field within the material 120 thus introduces losses into the second resonator.

Said losses are adjustable by means of the generator 124. If no voltage is applied, the losses are minimal and the quality factor of the second resonator is maximal, which corresponds to a pusle extracted from the first resonator of maximum time-duration. If the voltage applied to the electrodes 122 is increased, the losses within the second resonator increase, its quality factor decreases and the time-duration of the pulse extracted from the first resonator also decreases. There is thus provided a simple means of regulating the time-duration of the pulse extracted from the first resonator without any need to have recourse to moving parts and mechanical components. This method and this device are therefore particularly well suited to the case in which it may be desired to modulate in accordance with a predetermined law the time-duration of the pulse emitted by the laser.

Figure 13:
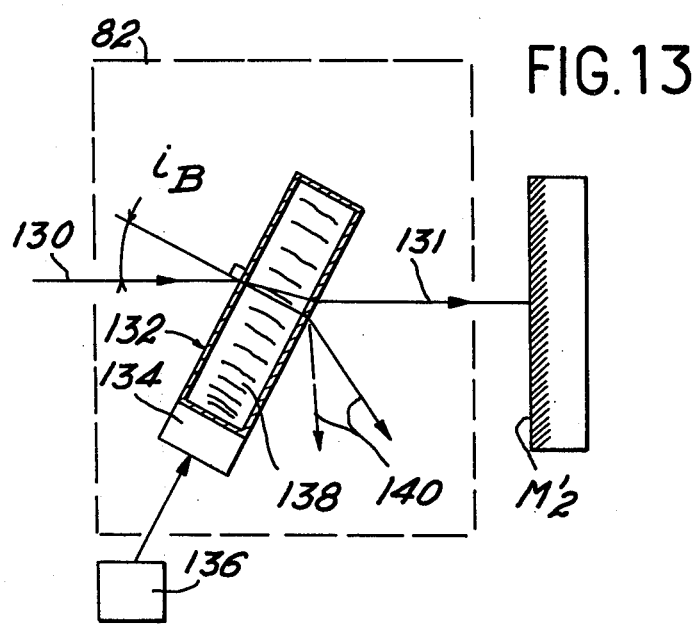
FIG. 13 is a further example of a device having variable losses and involving the use of an acoustico-optical deflection cell.

In FIG. 13, there is shown a further example of an variable-loss device which makes use of an acoustico-optical deflection cell. In this figure, the incident radiation 130 strikes an acoustico-optical deflection cell 132 at the Bragg angle of incidence $i_B$. The cell 132 is constituted by a piezoelectric transducer 134 which is excited by an electrical signal at an audiofrequency delivered by the generator 136. A system of traveling or stationary acoustic wave 138 is established within the liquid with which the cell 132 is filled. Said system of waves induces a periodic variation in refractive index which results in a diffraction of the incident beam 130 in the form of a plurality of diffracted beams 140. As is already known, the intensity of the diffracted wave 140 depends on the power injected into the liquid medium and therefore on the electric power delivered by the supply 136. If no power is applied to the transducer, the incident beam is not diffracted by the acoustico-optical cell and the beam 131 has the same intensity as the beam 130, in which case the losses are minimal. As soon as an electrical signal is applied to the deflection cell, the diffracted beam 140 is produced and, since its orientation is different from that of the beam 131, this results in partial misalignment of the second resonator which is equivalent to the introduction of losses. These losses can be adjusted in a very simple manner by modifying the electric power delivered by the generator 136.

The above-mentioned electro-optical or acoustico-optical devices require an electric power supply but it is apparent that this latter is not required to supply voltages having fast pulse-rise times as in the case of Q-switched systems but only variable and even fixed voltages.

Anyone versed in the art could readily conceive other devices for varying losses within a resonator; there can be mentioned by way of example an assembly constituted by two absorbent prisms and which are capable of sliding one over the other along their hypotenuse and which determine a variable thickness; diaphragms of variable aperture; liquid-crystal cells which operate in diffusion and the absorption of which is a function of the applied voltage, and so forth.

As mentioned in the foregoing, the invention is particularly well suited to lasers which employ a transition between two states such that the lifetime of the upper state is very short. This applies to the dyes, but also to certain gases and in particular to nitrogen or neon. It is known that nitrogen, for example, makes it possible to obtain pulses of high intensity and short duration of the order of one nanosecond, especially at 3371 A. In this connection, reference can be made, for example, to the article by D. A. Leonard entitled: "Saturation of the molecular nitrogen second positive laser transition" and published in "Applied Physics Letters", vol. 7, No 1, 1 July 1965, page 4. The duration of the pulse emitted by these lasers can be reduced even further by means of the method according to the invention to a fraction of a nanosecond.

It would clearly not constitute any departure from the scope of the invention to employ a medium in which the upper state of the transition employed does not have a short duration compared with that of the excitation. This is the case, for example, of ruby or doped glasses. It is therefore possible to employ the method and the double-resonator structure of the invention in lasers of this type even if these latter are Q-switched by known means, in which caes the invention makes it possible to reduce the time-duration of the Q-switched pulse even further. In this instance, the Q-switching means can be located within the portion which is common to both resonators.

There would also be no departure from the scope of the invention if the second resonator were allowed to remain stationary and the quality factor of the first resonator were modified since it is the difference between the quality factors of the two resonators which determines the competition between the two oscillations. By modifying the quality factor of the first resonator, however, the power extracted from said resonator is modified at the same time by direct action which is known per se and which finally complicates the interpretation of the results obtained.

The two-resonator laser in accordance with the invention could vaguely recall known structures which employ two coupled cavities such as the single-frequency gas lasers which employ a so-called Fox-Smith interferometer. This interferometer is composed of three mirrors which define two resonators, one being of substantial length and constituting the main resonator in which the amplifying medium is placed and the other being a short resonator which defines the position of the oscillation frequency by means of a coincidence between the frequencies of the modes of resonance. But all the differences between these two structures are apparent from the foregoing description of the laser according to the invention. Thus the laser of the Fox-Smith type does not usually operate in the pulse mode; the light employed is extracted from the resonator which has the greatest length and therefore has the highest quality factor whereas the reverse takes place in the present invention; the laser of the Fox-Smith type must be carefully tuned in order that coincidence should take place between the modes of resonance of the two resonators whereas there is no interferometric condition of this type in the laser according to the invention. Finally, the laser of the Fox-Smith type presupposes an amplifying medium of very high optical purity and resonators having longitudinal modes which are well defined in frequency, which excludes the liquid lasers in which the structure of the longitudinal modes is usually not observable since it is non-resolved except in the case of extremely thin resonators.

Furthermore, the originality of the two-resonator laser of the invention can readily be distinguished from known lasers involving the use of a medium which is capable of amplifying light at two different wavelengths (for example a helium laser and a neon laser which emit simultaneously at 6328 A and at 3.39 $\mu$) and which comprises two resonators, one of which is tuned to one transition (at 6328 A) whilst the other is tuned to another transition (at 3.39 $\mu$). On the contrary, the laser according to the invention employs two resonators tuned to the same transition in order to derive benefit from the competition phenomena which are inherent to this single transition.

Finally, it is clear that the laser according to the invention is different from certain two-resonator lasers in which one laser is designed to oscillate in one mode and the other is designed to oscillate in another mode. In lasers of this type, mode-selecting devices are necessary, which is not the case with the laser of the invention. Moreover, since the geometrical structures of two different oscillating modes are not the same, these oscillations are not supplied strictly in the same regions of the amplifying material; for example, a pure Gaussian fundamental mode is supplied at the center of the amplifying rod but a ring mode is supplied at the periphery. In the laser according to the invention which utilizes a competition between two oscillations, these oscillations must be supplied in the same amplifying regions.

The lasers in accordance with the invention constitute simple light sources which emit very short pulses of adjustable duration and make it possible to turn to profitable account all the advantages of the dye lasers, for example, in which conventional Q-switching is inapplicable. Sources of this type are well suited to telemetry, for example, in which the possibility of reducing the duration of the emitted pulse when the obstacle draws nearer is a decisive advantage, and also to high-speed photography.

We claim:

1. A method for adjusting the width of the light pulse emitted by a laser the steps of exciting an amplifying medium by pulsed pumping means within a first resonator obtaining a first oscillation sustained by a transition of the amplifying medium, obtaining from amplifying medium by means of the same transition a second oscillation in competition with the first oscillation within a second resonator tuning said second resonator to said transition, adjusting the quality factor of said second resonator higher than the quality factor of said first resonator and extracting a fraction of the energy of said first oscillation of said first resonator, said fraction of energy forming said pulse of adjustable width emitted by the laser, and adjusting said width by modifying the quality factor of said second resonator.

2. A method according to claim 1, including the step of adjusting the width of the pulse extracted from the first resonator by modifying the length of said second resonator.

3. A method according to claim 1, including the step of adjusting the width of the pulse extracted from the first resonator by modifying the coefficient of reflection of mirrors forming said second resonator.

4. A method according to claim 1, including the step of adjusting the width of the pulse extracted from the first resonator by varying the losses introduced into said second resonator.

5. A laser which emits a light pulse of adjustable width, comprising:
an amplifying medium having a stimulable transition, pulsed pumping means for exciting said medium,
a first resonator including two mirrors spaced at a distance of $L_1$, for containing said medium and for sustaining a first oscillation on said transition, said first resonator having a first quality factor,
a second resonator, including two mirrors spaced at a distance of $L_2$, for containing said medium and for sustaining a second oscillation on said transition, in competition with said first oscillation, said second resonator being continuously coupled to said first resonator and having a quality factor higher than said first quality factor,
means for extracting a fraction of said oscillation from said first resonator, said fraction forming said pulse of adjustable width, said width depending on the quality factor of said second resonator, and means for adjusting the quality factor of said second resonator and said width.

6. A laser according to claim 5, wherein at least one of the mirrors of said second resonator is mounted on a translational-motion table to adjust the length $L_2$.

7. A laser according to claim 5, wherein said amplifying medium is a gas excited by pulsed electric discharges.

8. A laser according to claim 5, wherein said amplifying medium has the shape of a rectangular parallelepiped having two first parallel faces spaced at a distance $L_1$ and two second parallel faces spaced at a distance $L_2$ with $L_2 > L_1$, said mirrors of said first resonator including said two first parallel faces having semi-reflecting layers and said mirrors of said second resonator including said two second faces having reflecting layers.

9. A laser according to claim 8, wherein the amplifying medium is a liquid solution of a fluorescent solute in a vessel of parallelepipedal shape, the excitation means being an auxiliary laser which operates in the pulse mode.

10. A laser according to claim 5, wherein said first and second resonators have a common mirror, one of said resonators being reversed by a beam-splitter.

11. A laser according to claim 10, including means for Q-switching the stimulated emission, said means being placed within a portion which is common to said first and second resonators.

12. A laser according to claim 10, wherein said amplifying medium is a liquid solution of a fluorescent solute contained in a cylindrical vessel, the excitation means being a flash-lamp.

13. A laser according to claim 10, wherein said common mirror is an orientable diffraction grating mounted as an autocollimator.

14. A laser according to claim 7, wherein said gas is at least one of the gases selected from the group consisting of argon, nitrogen, carbon dioxide, helium, and neon.

15. A laser according to claim 10, wherein said beam-splitter is a prism selected from the group comprising the Glazebrook, Nicol, Foucault and Glan prisms, the two waves within the two resonators being polarized in perpendicular directions.

16. A laser according to claim 10, wherein said beam-splitter is constituted by at least one plane Brewster-angle dioptric element.

17. A laser according to claim 5, wherein said laser further comprises means for introducing variable losses into said second resonator.

18. A laser according to claim 17, wherein said means for introducing variable losses in a movable inhomogeneous attenuator.

19. A laser according to claim 17, wherein said means for introducing variable losses is a birefringent electro-optical material inserted between two flat electrodes brought to suitable potentials, the neutral lines of said material being at an angle of 45° with respect to the direction of polarization of the radiation within said second resonator and an analyzer having a direction parallel to the direction of polarization of the radiation within said second resonator.

20. A laser according to claim 17, wherein said means for introducing variable losses is a an acoustico-optical diffraction cell beam deflector.

21. A laser according to claim 17, wherein said means for introducing variable losses is a movable inhomogeneous attenuator.

* * * * *